Figure 1:
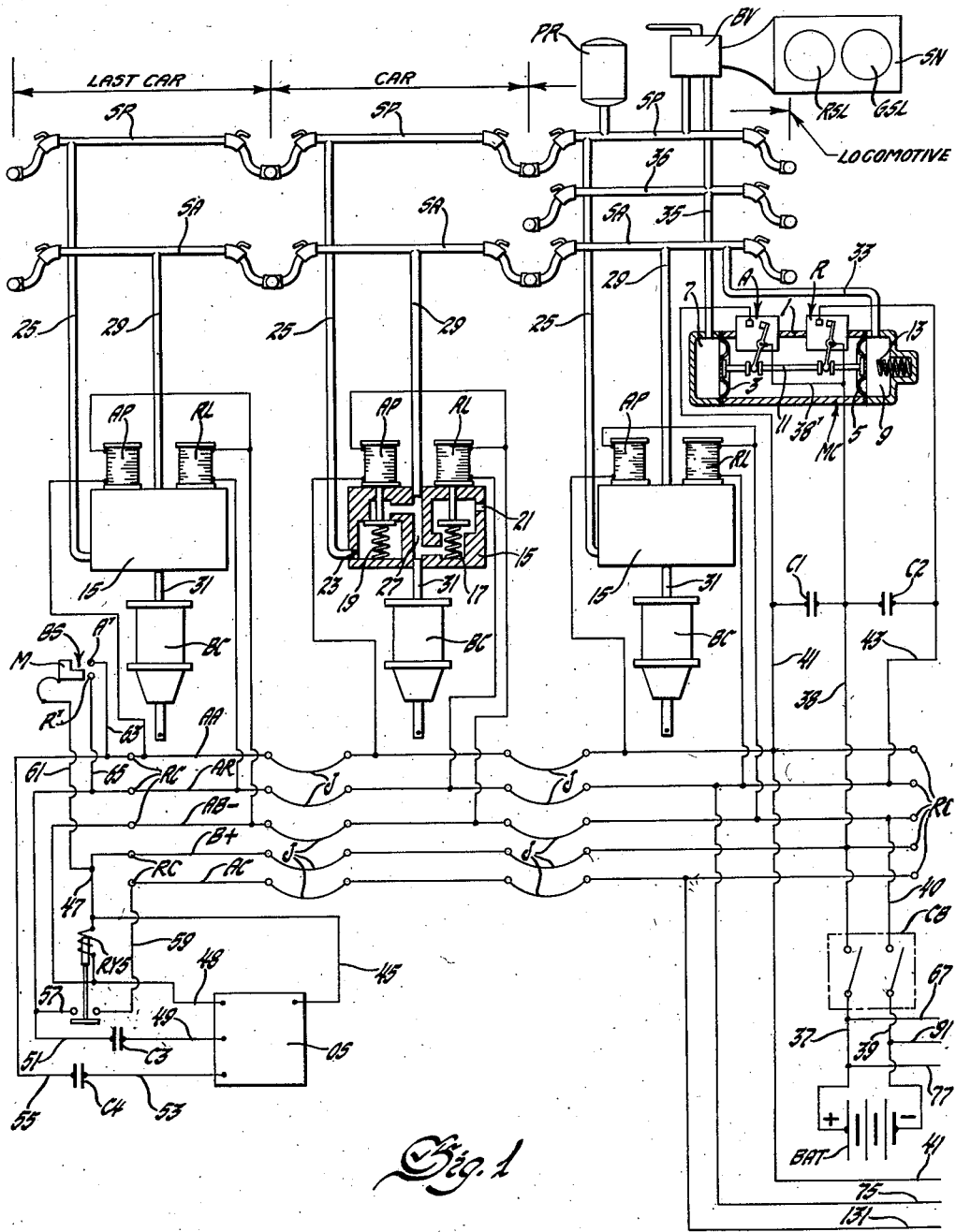

Aug. 13, 1957  K. D. SWANDER, JR., ET AL  2,802,935
CIRCUIT CHECKER FOR VEHICLE ELECTRO-PNEUMATIC BRAKE SYSTEMS
Filed Sept. 1, 1951  2 Sheets-Sheet 1

Inventors
Frank J. Vegh &
Kenneth D. Swander, Jr.
By
Willito, Helwig & Baillio
Attorneys

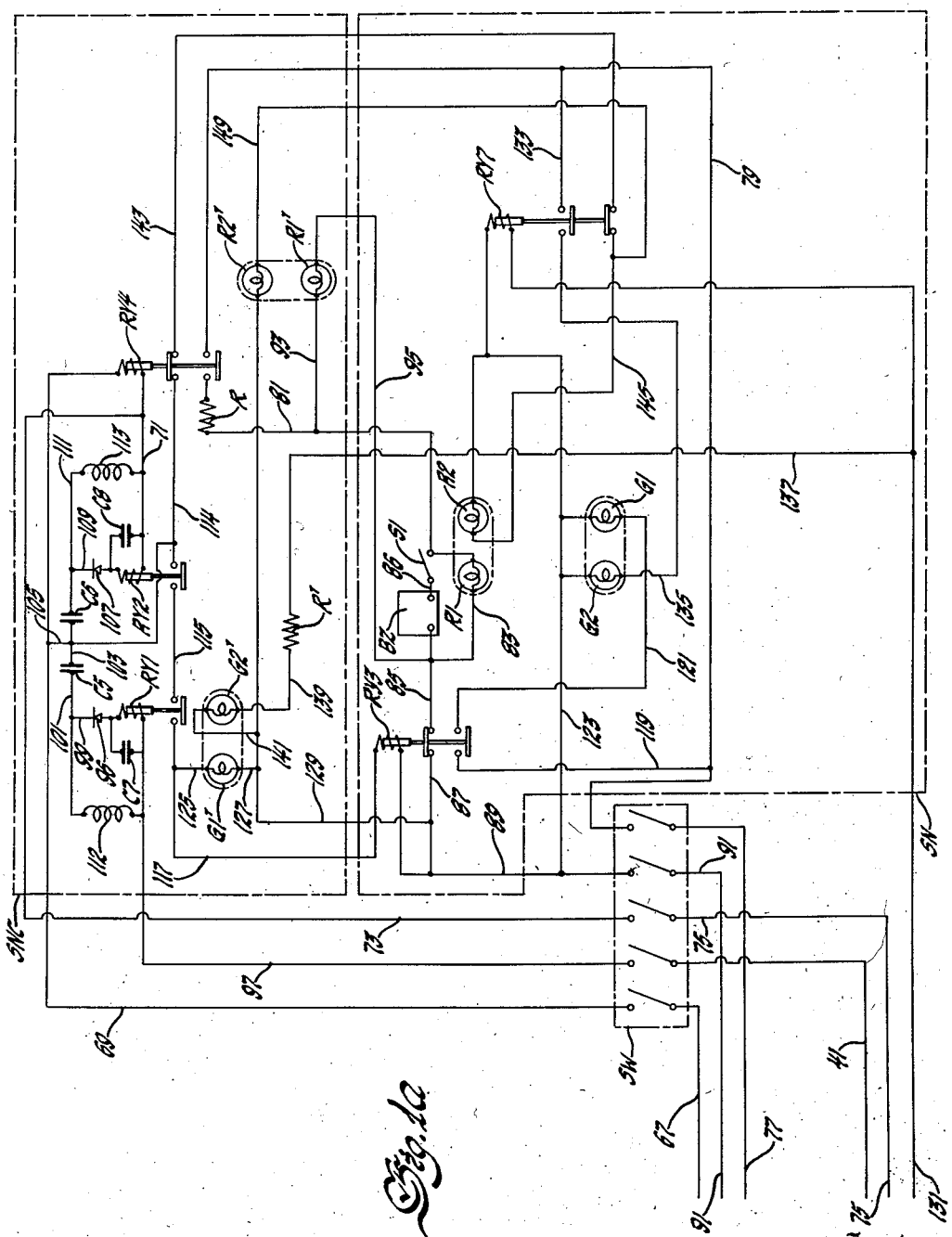

United States Patent Office 2,802,935
Patented Aug. 13, 1957

2,802,935

CIRCUIT CHECKER FOR VEHICLE ELECTRO-PNEUMATIC BRAKE SYSTEMS

Kenneth D. Swander, Jr., La Grange, and Frank J. Vegh, Hinsdale, Ill., assignors to General Motors Corporation, Detroit, Mich., a corporation of Delaware Application September 1, 1951, Serial No. 244,776

3 Claims. (Cl. 246—167)

This invention generally relates to electrical control circuit checking and signalling apparatus and more particularly to circuit checking and signalling apparatus for use with electro-pneumatic air braking controls for railway vehicles.

One of the obstacles to the widespread use of electropneumatic controls especially for railway vehicle air brakes has been the inability of the operator to determine whether these controls are in proper working order. It will be readily appreciated that if, for some reason, one or more of the control lines for energizing any of these controls should become broken or inoperative due to a short, it may prevent the application of the brakes which naturally gives rise to an extremely dangerous situation. The purpose of this invention, therefore, is to provide some means for checking the integrity of the power and control lines used to energize these air braking controls. This invention accomplishes the desired result by connecting an oscillator to the ends of the train line control conductors and the power lines and superimposing alternating current over at least some of these conductors and lines. This alternating current is then used to energize certain relays which operatively control integrity indication means and lack of integrity indication means. However, while the use of this alternating current is adequate for checking certain of the power and control lines of the brakes in the released and applied positions, it does not make all of the necessary indications concerning the integrity of the power and control lines when the brakes are in the applied condition. Therefore, to indicate the integrity of certain of the control lines when the brakes are applied, this invention provides a separate relay means to connect one side of the power train line with an additional auxiliary train line circuit which also may energize or deenergize visual integrity indication means and visual lack of integrity indication means.

In other words, the principal object of the invention is to provide simple and portable circuit checking and signalling apparatus which may be readily connected to conventional electropneumatic air brake systems for railway trains to continuously indicate the integrity or lack of integrity of such systems and the checking and signalling means by means of a minimum number of visual and audible signals when the train brakes are released and applied.

The specific combination of means by which this object is accomplished and other novel features thereof will become more apparent by reference to the following detailed description and drawings of one form of the invention which is particularly adaptable to conventional electropneumatic brake systems for railway trains, however similar means may be readily modified and applied to electrical control systems of other types to continuously check the integrity or lack of integrity of such systems.

Figures 1 and 1a, taken together, are a diagrammatic view of an electropneumatic braking control system and one form of circuit checking and signalling apparatus and the electrical circuit connectors interconnecting this apparatus and this system and constituting this invention.

As best seen in Figure 1, a conventional manually operable, self-lapping engineer's brake valve BV is provided on the locomotive or leading car of a train of coupled cars for selectively controlling either the conventional electropneumatic master controller MC on the locomotive for the electropneumatic braking apparatus or for controlling the associated conventional automatic air brake apparatus of the train in conventional manner.

The master controller MC includes a cylindrical housing 1 having a pair of flexible diaphragms 3 and 5 mounted therein to form chambers 7 and 9 between each diaphragm and an adjacent end of the housing 1. The central portions of the diaphragms 3 and 5 are interconnected by a connecting rod 11 having two grooves therein. Brake application and release control switches A and R of conventional type are shown secured to the housing 1 by suitable insulators intermediate the diaphragms 3 and 5. Each of the switches A and R include a stationary contact and a contact arm shown provided with a contact cooperating with the stationary contact and pivoted intermediate the ends and engaged at the inner end in a notch of the diaphragm connecting rod 11. The resilient diaphragms 3 and 5 or other suitable spring means, not shown, normally retain the diaphragm connecting rod 11 in the normal brake release control position shown, with the contact on the outer end of the contact arm of the release control switch R spaced slightly out of contact with the stationary contact thereof and with the contact on the outer end of the contact arm of the application control switch A spaced out of contact a greater amount with respect to the stationary contact thereof. This different spacing of the contacts of the switches A and R permits closure of the contacts of the release control switch R prior to causing closure of the contacts of the application control switch upon initial movement, to the right, of the diaphragms 3 and 5 and the connecting rod 11 upon application of air pressure to the chamber 7 and diaphragm 3 to cause application of the brakes. A spring stop 13 is placed in the chamber 9 and is contacted by the end of the connecting rod 11, when initially moved to the right sufficiently to cause closure of the contacts of the release switch R prior to closure of the contacts of the application switch A in conventional manner. As will be explained, this causes closure of all of the electromagnetic release valves RL on the locomotive and cars of the train to close off the atmospheric vent ports thereof connected to the brake cylinders BC prior to causing the opening of all of the electromagnetic application valves on the locomotive and cars of the train to apply air pressure to the brake cylinders BC and cause application of the train brakes in the usual manner.

The self-lapping brake valve BV is connected to the locomotive air pressure supply pipe SP, shown connected to a pressure reservoir PR which is supplied by the air brake compressor, not shown. The supply pipe SP on the locomotive and the supply pipes SP on the cars coupled thereto extend between the ends of these units of the train and are shown connected by flexible air hoses. The conventional electromagnetic brake application and release valves AP and RL of the locomotive and of each car of the train are shown located in a common valve housing 15. Each release valve RL is shown retained in an unseated position in the housing 15 by a spring 17 and each application valve AP is retained in a seated position in the housing 15 by a spring 19. An atmospheric vent port 21 is provided in each valve housing 15 for the release valve RL, and a pressure supply port 23 is provided in each housing 15 for the application valve AP. Each application port 23 is shown connected by a branch pipe 25 to a supply pipe SP. A passage 27 in each of the application and release valve housings 15 extends from the side of the seat for the application valve AP opposite the pressure supply port 23 to the side of the seat for the release valve RL opposite the atmospheric vent port 21. Each passage 27 is shown connected by a pipe 29 to a straight air pipe SA and is also connected by a pipe 31 to a conventional brake cylinder BC of the locomotive and each car. The straight air pipes SA of the locomotive and each car also extend between the ends thereof and are also shown connected by conventional air hoses. The purpose of the straight air pipes SA is to equalize the pressures contained in the braking cylinders BC and the right hand chamber 9 of the master controller MC.

The straight air pipe SA of the locomotive is also shown connected by a pipe 33 to the right-hand chamber 9 of the locomotive master controller MC and the left-hand chamber 7 of the master controller is connected by a pipe 35 to the self-lapping, engineer's brake valve BV. The pipe 35 is also connected to a pipe 36, shown extending from end to end of the locomotive and having air hoses connected to the ends of the pipe 36 for connection to similar pipes and the chambers 7 in master controllers MC on other locomotive units for operation and control in multiple. As shown in Figure 1, the air hoses are connected to conventional angle shutoff cocks attached to the ends of the supply and straight air pipes SP and SA of the locomotive and each car and to the ends of the pipe 36 of the locomotive in conventional manner.

The electromagnetic windings shown provided for actuating of the brake application and release valves AP and RL on the locomotive and each car are shown, in Figure 1, connected by train line control conductors AA, AR and AB— each connected between receptacle contacts RC on the ends of the locomotive and each car. Flexible jumper conductors J having contacts on the ends are insertable in receptacle contacts at the ends of the locomotive and each car to connect the windings of the application and release valves AP and RL to the application and release switches A and R of a master controller MC of a locomotive for multiple control thereby in conventional manner.

The windings of the electromagnetic application valves AP are directly connected between the application and the common return train line control conductors AA and AB— and the windings of the electromagnetic release valve RL are connected between the release and common return train line control conductors AR and AB—.

A battery BAT on the locomotive serves as the direct current power source for the electropneumatic brake apparatus and also as a power source for a high frequency alternating power source from a vacuum tube oscillator OS, serving as the brake circuit checking apparatus and shown on the rear car of the train. The battery BAT also serves to furnish power to a signalling apparatus SN and signal control apparatus SNC shown located on the locomotive.

A conventional double contact circuit breaker CB, of the thermal overload type and located on the locomotive, is connected across the battery BAT and opens automatically from the closed position, shown, upon excess current flow therefrom and a single throw five contact switch SW is provided to connect the signalling and signal control apparatus SN and SNC to the battery, train line control conductors and the brake circuit checking apparatus OS through other train line control conductors B+ and AC.

One set of contacts of the circuit breaker CB are connected in series between the positive terminal of the battery BAT and the positive battery train line control conductor B+ and to the contact arms of the application and release switches A and R of the master controller MC on the locomotive by conductors 37, 38 and 38'. The other set of contacts of the circuit breaker CB are connected in series by conductors 39 and 40 to the common return train line conductor AB— on the locomotive. The stationary contact of the application switch A in the master controller MC is connected by a conductor 41 to the locomotive application train line conductor AA of the locomotive. The stationary contact of the release switch R of the master controller is connected by a conductor 43 to the locomotive release train line conductor AR. A condenser C1 is connected directly across the contacts of the application switch A between the conductors 38 and 41 and another condenser C2 is connected directly across the contacts of the release switch R between the conductors 38 and 43.

As best shown in Figure 1, one end of a direct current power input conductor 45 for the brake circuit checking oscillator OS, on the rear car of the train, is shown connected to one winding terminal of a relay RY5, which is used to check the integrity of train line conductors AR, AC, B+ and AB— when the brakes are applied as will be more fully explained later in the specification. The other end of the conductor 45 is connected to a conductor 47, which is connected to the rear receptacle contact RC of the train line conductor B+ of the rear car. The opposite winding terminal of the relay RY5 is directly connected to a neutral or common return, alternating current conductor 48 of the oscillator OS. The conductor 48 is connected to the rear receptacle contact RC of the negative return, train line conductor AB— of the rear car. Another alternating current output conductor 49 is shown extending from the oscillator OS and a condenser C3 is connected in series between the conductor 49 and a conductor 51 shown connected to the rear receptacle contact RC of the train line release conductor AR of the rear car. A third alternating current output conductor 53 is shown leading from the oscillator OS and a condenser C4 is connected in series between the conductor 53 and a conductor 55 shown connected to the rear receptacle contact RC of the train line conductor AA of the rear car of the train.

The relay RY5 is provided with a pair of normally open contacts, shown connected in series by a conductor 57 between the conductor 51 and a conductor 59 connected to the rear receptacle contact RC of the train line conductor AC of the last car of the train.

A manually operable back-up, brake application and release control switch BS is provided on the rear car. The switch BS is provided with a pair of stationary application and release contacts A' and R' and a manually movable contact M which is movable from a brake released or running position, as shown, first into contact with the contact R' and then into bridging relation with the contacts A' and R'. The movable contact M is shown connected by a conductor 61 to the conductor 47 connected to the train line conductor B+. The release contact R' is connected by a conductor 65 to the conductor 51 connected to the release train line conductor AR and the application contact A' is connected by a conductor 63 to the conductor 55 which is connected to the application train line conductor AA.

As best shown in Figures 1 and 1a, two sets of contacts of the five pole switch SW on the locomotive are connected in series with a winding of a relay RY4 in the signal control apparatus SNC between the positive input conductor 37 of the circuit breaker CB and the train line conductor AR on the locomotive by conductors 67, 69, 71, 73 and 75. The relay RY4 is provided with normally closed and normally opened interlocks which control visual lack of integrity indication circuits and visual integrity indication circuits respectively.

Upon closure of the contacts of the circuit breaker CB and the five pole switch SW, the circuit checking oscillator OS and the windings of the relays RY5 and RY4 are simultaneously energized. The circuit checking oscillator OS is energized through conductors 37, 38, train line conductors B+, conductor 47 and the input conductor 45 of the oscillator. The winding of the relay RY5 is energized through the conductors 47, and 48, the negative train line conductors AB— and conductors 40 and 39. The winding of the relay RY4 is energized through conductors 37, 67, 69, 71, 73, 75, the release train line conductor AR, the windings of the electromagnetic release valves RL, the train line conductors AB— and conductors 40 and 39.

Energization of the winding of the relay RY5 causes closure of the normally open contacts thereof to connect the train line release conductor AR with the train line conductor AC at the rear end of the rear car of the train. The relay RY5 is provided to control signals in the locomotive to indicate the integrity of the train line conductors, only when the electropneumatic brakes are applied and will be referred to later in describing electropneumatic brake application.

Energization of the winding of the relay RY4 causes the closure of the normally open contacts and the opening of the normally closed contacts to illuminate the red signal lamps R1 and R1' while the brake circuit checking oscillator OS is warming up and until the frequency and alternating current output rise to normal values.

The red signal lamp R1 and another red signal lamp R2 are preferably positioned behind a single lens RSL in the signal apparatus SN which is supported on the engineer's brake valve BV, as seen in Figure 1.

Two green signal lamps G1 and G2 are also positioned behind another single lens GSL of the signal apparatus SN. Two red signal lamps R1' and R2' are positioned behind a single lens, not shown, in the signal control apparatus SNC which is preferably located in the power compartment of the locomotive cab to give the same visual indication obtained at the engineer's brake valve to thereby aid in correcting the trouble indicated without referring to the indications on the brake valve. Two green signal lamps G1' and G2' are also positioned behind another lens, not shown, in the signal control apparatus SNC for the same reason given in favor of R1' and R2'. Each of the red lamps R1' and R2' in the signal control apparatus SNC are connected to operate in conjunction with each of the red lamps R1 and R2 in the signal apparatus SN, and each of the green lamps G1' and G2' in the signal control apparatus SNC are also connected to operate in conjunction with each of the green lamps G1 and G2 in signal apparatus SN. The lamps R1', R2', G1' and G2' accordingly serve as repeater or pilot signal lamps for the respective lamps R1, R2, G1 and G2.

When the winding of the relay RY4 is energized the normally open contacts thereof are closed. These contacts are shown in Figure 1A and are connected in series with the red lamps R1, a suppressor resistor R, the normally closed contacts of a relay RY3 and two sets of contacts of the five pole switch SW between the conductors 37 and 39 connected directly to the positive and negative terminals of the battery BAT by means of conductors 77, 79, 81, 83, 85, 87, 89 and 91. Upon closure of the normally open contacts of RY4, the red lamp R1 will then be illuminated. A buzzer BZ and a buzzer disconnecting switch S1, shown connected in series therewith, are connected in shunt relation with the red lamp R1 between conductors 81 and 85 by a conductor 86 when the buzzer disconnecting switch S1 is closed and the buzzer will sound when the red lamp R1 is illuminated. The repeater red lamp R1' will also be illuminated as it is also connected in shunt relation with the red lamp R1 and buzzer BZ by conductors 93 and 95 while the tube of oscillator circuit checking apparatus OS is warming up to indicate that the electropneumatic checking apparatus is not operating.

The opening of the normally closed contacts of the relay RY4 opens a circuit for the red lamp R2. This circuit includes the conductors 67 and 91, and the red lamp R2, the normally closed contacts, now open, of the relay RY4 and the normally closed contacts of a relay RY7, shown in Figure 1A, connected in series between the conductors 67 and 91 by conductors 69, 105, 114, 143, 145, 123 and 89.

Upon warm up of the tubes of the oscillator OS to normal frequency and alternating current output, alternating current therefrom will pass the condensers C3 and C4 and be applied to the rear end of the application and release train line conductors AA and AR by means of the output conductors 49 and 53 of the oscillator OS and conductors 51 and 55. Alternating current will also be superimposed on the return train line conductors AB— through the alternating current neutral or return conductor 48 of the oscillator OS.

The winding of the relay RY1, a rectifier 96, a condenser C5 and one set of contacts of the five pole switch SW are shown connected in series relation between the locomotive train line conductor AA and the positive terminal of the battery BAT by conductors 41, 97, 99, 101, 103, 105, 69, 67 and 37.

The winding of the relay RY2, a rectifier 107 and a condenser C6 also are shown connected in series relation between the locomotive train line conductors AR and the positive terminal of the battery BAT by conductors 75, 73, 71, 109, 111, 103, 105, 69, 67 and 37.

An inductance coil 112 is shown connected between the conductors 97 and 101 in shunt relation with the winding of the relay RY1 and rectifier 96 connected in series therewith and a similar inductance coil 113 is shown connected between the conductors 71 and 111 and in shunt relation with the winding of the relay RY2 and rectifier 107 connected in series therewith. A condenser C7 is connected directly across the winding of the relay RY1 and a similar condenser C8 is connected directly across the winding of the relay RY2. It has been found that by selecting suitable values of inductance and capacitance for the inductance coils 112 and 113 and the condensers C7 and C8 and connecting them in the above described manner to each of the windings of the relays RY1 and RY2 causes closure of the contacts of these relays when small values of alternating current are applied thereto after the oscillator tubes of oscillator OS have sufficiently warmed up. The rectified alternating current from the windings of the relays RY1 and RY2 passes back through the conductors 69, 67 and 37, the battery BAT, conductors 39 and 40, train line control conductors AB— and the neutral or return conductor 48 to the oscillator OS on the rear car. The windings of the electromagnetic application and release valves AP and RL are of high impedance and little alternating current flows in parallel therethrough between application, release and return train line conductors AA, AR and AB—. Also some alternating current will flow from the application and release train line conductors AA and AR through the condensers C1 and C2 across the contacts of the application and release switches A and R of the master controller MC to the conductor 38 and pass back through the conductor 37, battery BAT, conductors 39, 40, train line conductors AB— and neutral or return conductor 48 to the oscillator OS on the rear car.

Energization of the windings of the relays RY1 and RY2 by the alternating current from the oscillator superimposed on the train line control conductors AA, AR and AB— causes the normally open contacts of the relays RY1 and RY2 to close. These relay contacts are connected in series relation with the winding of a relay RY3 in the signal control apparatus SNC between conductors 105 and 89 by conductors 114, 115 and 117 and upon closure of these contacts the winding of the relay RY3 is energized from the battery BAT through conductors 37, 67, 69, 105, 114, 115, 117, 89, 91 and 39. This causes the opening of the normally closed contacts of the relay RY3 which opens the above described return circuit of the buzzer BZ and red signal lamps R1 and R1' and causes simultaneous closure of the normally open contacts of the relay RY3. The normally open contacts of the relay RY3 are connected in series relation with the green lamp G1 between conductors 79 and 89 by conductors 119, 121 and 123 and upon closure of these contacts the green lamp G1 will be energized and illuminated through conductors 37, 77, 79, 119, 121, 123, 89, 91 and 39. The repeater green lamp G1' will also be illuminated as it is connected in series relation by the conductors 125, 127 and 129 between conductors 117 and 89 which are connected across the winding of the relay RY3.

Deenergization of the buzzer BZ and red signal lamps R1 and R1' and energization and illumination of the green signal lamps G1 and G1', in the above described manner, indicates the integrity of the train line braking control connections AA, AR and AB— and also indicates the integrity of the train line connections B+ from the battery BAT on the locomotive to the oscillator checking apparatus OS on the rear car for all of these train line connections when the engineer's brake valve BV is in the running position and the train brakes are released.

With the green lamps G1 and G1' illuminated and the brakes released if a break occurs in the application train line conductor AA of the locomotive and any car or if any jumper J interconnecting these train line conductors is disconnected, the winding of the relay RY1 is deenergized and the relay contacts open to deenergize the winding of the relay RY3 causing the contacts of this relay drop out to the normal position, shown, and thereby cause deenergization of the green lamps G1 and G1' and reenergization of the buzzer BZ and the red lamps R1 and R1' to indicate lack of integrity of the application train line conductors AA.

A break in any release train line conductor AR or disconnection of a jumper conductor J interconnecting any of these conductors causes deenergization of the winding of the relay RY2 and its contacts drop out to the position shown. This likewise deenergizes the winding of the relay RY3 and its contacts drop to the position shown to cause illumination of the red lamps R1 and R1' and deenergization of the green lamps G1 and G1'.

If a short circuit occurs between the application and return train line conductors AA and AB— alternating current from the oscillator OS will be shunted around the winding of the relay RY1 and if a short circuit occurs between the release and return train line conductors AR and AB— alternating current from the oscillator will be shunted around the winding of the relay RY2. This also causes deenergization of the green lamps G1 and G1' and energization of the buzzer BZ and red lamps R1 and R1'.

If a short circuit occurs between the power and return train line conductors B+ and AB— the excess current flow through the thermal overload circuit breaker CB causes the contacts thereof to open automatically. This causes the opening of the circuit including the positive battery conductors 37 and 38 and the train line conductors B+ to the winding of the relay RY5 and oscillator OS and alternating current therefrom is cut off the windings of the relays RY1 and RY2 and contacts of these relays fall to the normal position shown. This opens the circuit from the positive battery terminal comprising conductors 37, 67, 69, 105, 114 and 115 to deenergize the winding of the relay RY3 and the green lamp G1' and its contacts fall to the normal position and also reestablish the return circuit from the buzzer BZ and red lamps R1 and R1' and to deenergize the green lamp G1. After removal of the short circuit to obtain electropneumatic control of brake application the circuit breaker CB must be reclosed manually. If the short circuit cannot be removed the engineer may move the conventional selector lever, not shown, provided in the air brake system to automatic brake position and proceed with automatic air brake control by the engineer's brake valve.

With the green lamps G1 and G1' illuminated to integrity of the electropneumatic control system and the checking oscillator and signals with the brakes released, the normally open contacts of the relay RY5 on last car of the train are closed to connect the train line conductors AR and AC together by means of conductors 51, 57 and 59. The train line conductor AC of the locomotive is connected by a conductor 131 to the winding terminal of a relay RY7 in the signal control means SN and the opposite winding terminal of the relay RY7 is connected to the conductor 123. The relay RY7 is provided with a normally open set and a normally closed set of contacts movable from the normal position upon application of the brakes to substitute the green signal lamps G2 and G2' for the green signal lamps G1 and G1' and to set up a circuit to the red signal lamps R2 and R2'. The green lamp G2 and normally open contacts of the relay RY7 are connected in series by conductors 133 and 135 between the conductors 79 and 123 and the green signal lamp G2' is connected in series with a suppressor resistor R' between conductors 131 and 129 by the conductors 137, 139 and 141. The normally closed contacts of the relays RY7 and RY4 and the red lamp R2 are connected in series by the conductors 143 and 145 between the conductors 114 and 123 and the red lamp R2' is connected by a conductor 149 between the conductors 129 and 145.

Electropneumatic brake application on the locomotive and train takes place when engineer moves the handle of the self-lapping brake valve BV from the released or running position toward the maximum brake application position. This causes air pressure to flow from the locomotive pressure reservoir PR through the supply pipe SP and pipe 35 to the chamber 7 in the master controller MC. The pressure applied to the chamber 7 and diaphragm 3 of the master controller MC is proportional to the extent of movement of the handle of the brake valve BV from the released or running position to the maximum brake application position in conventional manner and causes movement of the diaphragms 3 and 5 and connecting rod 11 to be moved to the right. As previously explained, initial movement of the diaphragms 3 and 5 and the diaphragm connecting rod 11 to the right causes the release switch R on the master controller to be closed before the application switch A. Closure of the release switch R causes energization of the windings of the release valves RL on the locomotive and cars through conductors 37, 38 and 43, train line conductors AR and AB— and conductors 40 and 39. This causes seating of the train release valves RL to close the atmospheric vent ports 21 in the valve housings 15. Subsequent closure of the application switch A causes energization of the windings of the application valves AP through conductors 37, 38, 38' and 41, train line conductors AA and AB— and conductors 40 and 39. This causes unseating of the application valves AP and air pressure from the supply pipes SP enters the brake cylinders BC and straight air train pipes SA through the pipes 25 and the supply ports 23, passages 27 in the valve housings 1 and pipes 29 and 31. When the air pressure in the straight air train pipes SA and chamber 9 in the master controller MC, which is connected by the pipe 33 to the straight air pipes SA, reach a value substantially equal to that in the chamber 7 in the master controller the diaphragms 3 and 5 and diaphragm connecting rod 11 therebetween will be moved back to the left by the spring 13 just far enough to open the application switch A. This limits the air pressure applied to the brake cylinders BC to the value set by the self-lapping brake valve BV by deenergization of the windings of the application valves AP upon opening of the application switch A.

If the green lamps G1 and G1' are illuminated prior to application of the train brakes, indicating the integrity of the train line connections, when the release contacts R of the master controller close before closure of the application switch A to cause brake application, current is applied from conductors 37, 38 and 43 to the release train line conductors AR. This simultaneously shorts the alternating current feed to the winding of the relay RY2 through the condenser C2 across the contacts of the release switch R and conductors 38 and 43 and applies equipotential direct current to the terminals of the winding of the relay RY4 as one terminal is connected to the movable contact of the release switch R by conductors 38, 37, 67 and 69 and the other terminal connected to the stationary contact of the release switch by the conductors 71, 73, 75, release train line conductor AR and conductor 43. This causes the contacts of the relays RY2 and RY4 to drop to the normal position shown, and also causes direct current to flow from the train line conductor AR on the locomotive, the release train conductors AR and from the release train line conductor on the rear car through the then closed contacts of the relay RY5, the conductors 51, 57 and 59 connected thereto and through the train line conductors AC and conductor 131 on the locomotive connected between the train line conductor AC on the locomotive to one terminal of the winding of the relay RY7. Return direct current flow from the other winding terminal of the relay RY7 to the negative battery terminal is through conductors 123, 89, 91 and 39, and this causes energization of the winding of the relay RY7 and closure of the normally open contacts and the opening of the normally closed contacts of this relay. The green lamp G2' is also illuminated at this time as it is connected between the conductor 131 and the negative battery terminal by a suppressor, resistor R' and conductors 137, 139, 141, 129, 87, 89, 91 and 39. The closure of the normally open contacts of the relay RY7 causes energization and illumination of the green lamp G2 through conductors 37, 77, 79, 133, 135, 123, 89, 91 and 39. When the contacts of the relay RY4 dropped to the normal position shown, the circuit connection to the red lamps R1 and R1' and buzzer BZ are opened by the opening of normally open contacts of the relay RY4 and a feed connection is set up for the red lamps R2 and R2', which feed connection includes the normally closed contacts of the relay RY4 and the now opened, normally closed contacts of the relay RY7. When the contacts of the relay RY2 opened, the green lamp G1' and the winding of the relay RY3 were deenergized and the contacts of the relay RY3 dropped to the normal position to set up the previously described return circuit from the buzzer BZ and the red lamp 1 and to open the feed circuit to the green lamp G1.

With the brakes applied and the green lamps G2 and G2' illuminated a break or open in the train line conductors AR, AC, B+ or AB— or the jumper conductors interconnecting these conductors will open the energizing circuit to the winding of the relay RY5 or else the circuit through the interlocks of RY5, thereby deenergizing the connection through the AC train line conductors to the green lamp G2' and the winding of the relay RY7 to cause the contacts of this relay RY7 to drop to the normal position. This opens the energizing circuit to the green lamp G2 and completes the circuit set-up through the normally closed contacts of the relays RY4 and RY7 previously mentioned, to the red lamps R2 and R2' to illuminate these lamps and indicate the lack of integrity of any of these train line conductors. The same red signal indication will occur should a short circuit occur between the power train line conductors B+ and AB— or conductors connected therewith causing opening of the circuit breaker CB by excessive current flow which also deenergizes the AC train line conductor and the windings of relays RY5 and RY7.

Should a short circuit occur between the application and release train line conductors AA and AR before application of the electropneumatic brakes no signal indication by the red lamps R1 and R1' will take place and no signal indication will be provided by the red signal lamps R2 and R2', substituted thereby upon application of the brakes as application and release of the brakes by the brake valve BV is provided even though the application and release train line conductors AA and AR are shorted as both of these conductors are energized to cause brake application. Under these conditions, however, no automatic regulation of the brake pressure by the master controller MC occurs in response to variation of pressure application thereto by the engineer's brake BV, and release of the brakes can be made by return of the brake valve handle to the release or running positions. Release of the brakes is accomplished by movement of the brake valve to bleed air out of the master cylinder chamber 7 to cause opening of the release switch R and deenergization of the windings of the release valves RL to vent the brake cylinders BC. Also, application and release of the electropneumatic brakes can be made by the back up switch BS.

The above described brake checking and signalling apparatus is portable and may be readily installed on existing electropneumatic brake systems which include a changeover lever, not shown, which may be operated by the engineer upon illumination of a red signal to show a lack of integrity of the train line control conductors and direct current supply therefor and lack of integrity of the oscillator and signal apparatus. Operating of the changeover lever cuts in the automatic air brake system for conventional control by the engineer's brake valve BV. By use of a single lens RSL for the two red signal lamps R1 and R2 and another single lens for the two green lamps G1 and G2 in the signal apparatus SN mounted on the engineer's brake valve BV, the engineer is constantly informed as to the integrity or lack of integrity of the electropneumatic brake system and the checking and signalling apparatus therefor. The buzzer BZ also sounds a warning of the lack of integrity of the system.

We claim:

1. In an integrity checking and signalling system for an electropneumatic braking system for a railway train having power supply, power return, brake application, brake release and spare train line conductors and a pneumatic master controller and engineer's brake valve on the lead unit of the train, integrity and lack of integrity signal lenses located adjacent the brake valve, signal relay control means for said signal means, means to connect and disconnect said signal and signal relay control means with the train line conductors and means connected to the rear end of all of the train line conductors except the spare train line conductor to receive power from the power supply and return train line conductors and to apply alternating checking current to all of the said train line conductors except said spare train line conductor and a signal control relay having a winding connected between the rear ends of the supply and return train line conductors and contacts operable by the winding to connect the rear ends of the release and spare train line conductors together to energize said signal control relay and control the operation of said integrity and lack of integrity signal lenses.

2. In an integrity checking and signalling apparatus for an electropneumatic braking system for a railway train having positive and negative power train line conductors, application and release control and spare train line conductors, all of said train line conductors extending between the ends of the train, signal apparatus having two lenses located at the head end of the train line conductors, first and second integrity signal lamps behind one lens, and first and second lack of integrity lamps behind said other lens, first and second signal relay means to control said first and second lack of integrity lamps, a third signal relay means for controlling operation of said second relay means, said first and second relay means having contacts normally positioned to complete a circuit including said second lack of integrity signal lamp, a winding connected between the head ends of the positive and release train line conductors for energization to move said relay contacts on said first signal relay means to connect said first lack of integrity signal lamp across the positive and negative train line conductors for illumination thereof, said second relay means having a winding connected between the head ends of the negative and spare train line conductors, said contacts on said second signal relay means being operable by said second relay winding to disconnect said second lack of integrity lamp from said battery and to connect said second integrity lamp with the head ends of said positive and negative train line conductors, said third relay means having normally open contacts connected between the rear ends of the release and spare train line conductors and a winding connected across the positive and negative train line conductors to energize said second relay winding and cause closure of the contacts of said third relay means.

3. In an electrical integrity checking and signalling apparatus for an electropneumatic braking system for a railway train having positive and negative power train line conductors, brake appilcation and release control train line conductors, and one spare train line conductor and manual brake control means, signal apparatus located adjacent the manual brake control means and comprising first and second lack of integrity signal lamps in side-by-side relation, first and second integrity signal lamps located in side-by-side relation and adjacent said first mentioned signal lamps, an oscillator connected to the rear ends of the power and control train line conductors to receive power from said power conductors and to apply alternating checking current to said power and control train line conductors, first, second and third electrically operated signal control means normally positioned to connect said first and second lack of integrity lamps to said power train line conductors for illumination, said first electrical signal control means having a winding connected between the head ends of the positive power and release control train line conductors for energization and operation to disconnect said second lack of integrity lamp from and to connect said first lack of integrity lamp with the head ends of the power train line conductors, said second electrical signal control means being connected with the positive power and release and application control train line conductors for operation by alternating current applied thereto to connect said first integrity signal lamp to said power train line conductors and to disconnect said first lack of integrity lamp therefrom, a fourth electrically operated relay means connected to the rear ends of said power train line conductors to energize said third relay control means connected between the front ends of said negative power and spare train line conductors, said fourth relay means being operable to connect the rear ends of the spare and release control train line conductors together to energize said second relay control means to disconnect said second lack of integrity lamp from the front ends of the power train line conductors and to connect said second integrity signal lamp thereto, said first and second signal control means being deenergized upon energization of said release control train line conductor from the power train line conductors by the manually operable brake control means to apply the train brakes.

References Cited in the file of this patent
UNITED STATES PATENTS

| | | |
|---|---|---|
| 2,073,443 | Cardozo | Mar. 9, 1937 |
| 2,464,978 | Hines | Mar. 22, 1949 |
| 2,500,939 | Exner | Mar. 21, 1950 |
| 2,501,590 | Volz | Mar. 21, 1950 |
| 2,581,527 | Gilson | Jan. 8, 1952 |
| 2,590,483 | Volz | Mar. 25, 1952 |
| 2,605,334 | Hines | July 29, 1952 |
| 2,622,542 | Bonanno | Dec. 23, 1952 |